United States Patent
Yu et al.

(10) Patent No.: US 9,061,686 B2
(45) Date of Patent: Jun. 23, 2015

(54) ROAD GRADE ESTIMATION FOR A TRAILERED VEHICLE

(71) Applicant: Ford Global Technologies, LLC, Dearborn, MI (US)

(72) Inventors: Hai Yu, Canton, MI (US); Ryan Abraham McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 79 days.

(21) Appl. No.: 14/065,757

(22) Filed: Oct. 29, 2013

(65) Prior Publication Data

US 2015/0120157 A1    Apr. 30, 2015

(51) Int. Cl.
| | |
|---|---|
| *G06F 17/10* | (2006.01) |
| *B60W 40/076* | (2012.01) |
| *B60T 7/12* | (2006.01) |
| *B60W 30/14* | (2006.01) |
| *F16H 61/02* | (2006.01) |

(52) U.S. Cl.
CPC ............... *B60W 40/076* (2013.01); *B60T 7/12* (2013.01); *B60W 30/14* (2013.01); *F16H 61/02* (2013.01)

(58) Field of Classification Search
CPC ........... B60T 8/00; B60T 13/683; B60T 8/18; B60T 8/1887; B60T 8/241; B60T 8/245; B60T 8/248; B60T 8/323; B60T 8/328; B62D 5/07; F16H 2059/525; F16H 59/52; F16H 61/0213; G01G 19/086; G01L 5/20

USPC ............... 701/54, 55, 124; 303/2, 3, 4, 5, 10, 303/113.4, 114.1, 115.4
See application file for complete search history.

(56) References Cited

U.S. PATENT DOCUMENTS

| | | | | |
|---|---|---|---|---|
| 5,050,938 | A * | 9/1991 | Brearley et al. | 303/7 |
| 5,986,544 | A * | 11/1999 | Kaisers et al. | 340/431 |
| 6,179,389 | B1 * | 1/2001 | Freitag et al. | 303/2 |
| 6,345,228 | B1 * | 2/2002 | Lees | 701/117 |
| 6,668,225 | B2 * | 12/2003 | Oh et al. | 701/70 |
| 2002/0091481 | A1 * | 7/2002 | Hessmert et al. | 701/124 |
| 2007/0271017 | A1 * | 11/2007 | Samie | 701/55 |

FOREIGN PATENT DOCUMENTS

| | | |
|---|---|---|
| FR | 2846086 | 4/2004 |
| JP | H10122014 | 5/1998 |
| JP | 200371876 | 12/2002 |

\* cited by examiner

*Primary Examiner* — Redhwan k Mawari
(74) *Attorney, Agent, or Firm* — Carlson, Gaskey & Olds, P.C.

(57) ABSTRACT

A vehicle control method includes, among other things, recording a towing vehicle road grade for a fixed road position when a towing vehicle tows a trailered vehicle. The method further includes shifting, using a controller, the recording to provide a trailered vehicle road grade for the fixed road position based upon the towing vehicle road grade and initiating a vehicle control adjustment to control the towing vehicle based upon the trailered vehicle road grade.

17 Claims, 3 Drawing Sheets

ROAD GRADE ESTIMATION FOR A TRAILERED VEHICLE

BACKGROUND

This disclosure relates generally to estimating a road grade and, more particularly, to estimating road grade below a trailered vehicle.

Towing vehicles tow trailered vehicles. A truck is an example towing vehicle. A boat trailer is an example trailered vehicle. Both are example vehicles.

Extreme road grades may cause a trailered vehicle to exert considerable pulling force on the towing vehicle. If the towing vehicle does not account for this pulling force, the towing vehicle braking force may be insufficient.

The road grade beneath a vehicle can be used to determine a road gradient load torque. Measuring or estimating road grade beneath a vehicle is useful for at least this reason.

Although a towing vehicle and a trailered vehicle are in close proximity during towing, the road grade beneath the towing vehicle may differ considerably from the road grade beneath the trailered vehicle. Although sensors mounted to towing vehicles have been used to suitably estimate road grade beneath the towing vehicles, monitoring the road grade beneath the trailered vehicle is difficult. Towing vehicles are rarely equipped with sensors capable of monitoring road grade.

SUMMARY

A vehicle control method according to an exemplary aspect of the present disclosure includes, among other things, controlling a towing vehicle based upon a trailered vehicle road grade.

In another example of the foregoing method, the trailered vehicle road grade is based upon a towing vehicle road grade of the towing vehicle.

In another example of any of the foregoing methods, the trailered vehicle road grade at a position is based upon the towing vehicle road grade at the position.

In another example of any of the foregoing methods, the method includes recording the towing vehicle road grade when the towing vehicle tows the trailered vehicle forward, and shifting the recording of the towing vehicle road grade to calculate the trailered vehicle road grade, wherein the shifting comprises a spatial domain shift of the towing vehicle road grade.

In another example of any of the foregoing methods, the method includes initiating a vehicle control adjustment in response to the trailered vehicle road grade.

In another example of any of the foregoing methods, the vehicle control adjustment comprises increasing braking force applied to the towing vehicle in response to the trailered vehicle road grade.

In another example of any of the foregoing methods, the trailered vehicle road grade is an estimated trailered vehicle road grade.

A system for controlling a towing vehicle according to an exemplary aspect of the present disclosure includes, among other things, a sensor to monitor a towing vehicle road grade of the towing vehicle, and a controller configured to control the towing vehicle based upon a trailered vehicle road grade.

In another example of the foregoing system, the trailered vehicle road grade is based upon the towing vehicle road grade.

In another example of any of the foregoing systems, the towing vehicle is configured to tow the trailered vehicle.

In another example of any of the foregoing systems, the sensor assembly is mounted to the towing vehicle.

In another example of any of the foregoing systems, the controller is mounted to the towing vehicle.

In another example of any of the foregoing systems, the trailered vehicle road grade at a position is based upon the towing vehicle road grade at the position.

A system for controlling a towing vehicle according to another exemplary aspect of the present disclosure includes, among other things, a road grade assembly providing a towing vehicle road grade, and a trailered road grade based upon the towing vehicle road grade, and a controller configured to adjust operation of the towing vehicle based upon the trailered vehicle road grade.

In another example of the foregoing system, the controller adjusts vehicle braking based upon the trailered vehicle road grade.

In another example of any of the foregoing systems, the controller adjusts vehicle cruise control based upon the trailered vehicle road grade.

In another example of any of the foregoing systems, the controller adjusts a transmission shift schedule based upon the trailered vehicle road grade.

In another example of any of the foregoing systems, the trailered vehicle road grade at a position is based upon the towing vehicle road grade at the position.

A system for controlling a towing vehicle according to yet another exemplary aspect of the present disclosure includes, among other things, a controller configured to adjust operation of the towing vehicle based upon a trailered vehicle road grade.

In another example of the foregoing system, the controller adjusts vehicle braking based upon the trailered vehicle road grade.

In another example of any of the foregoing systems, the controller adjusts vehicle cruise control based upon the trailered vehicle road grade.

In another example of any of the foregoing systems, the controller adjusts a transmission shift schedule based upon the trailered vehicle road grade.

In another example of any of the foregoing systems, the system includes a road grade sensor assembly to sense a towing vehicle road grade, and to provide a trailered road grade.

In another example of any of the foregoing systems, the trailered vehicle road grade at a position is based upon the towing vehicle road grade at the position.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
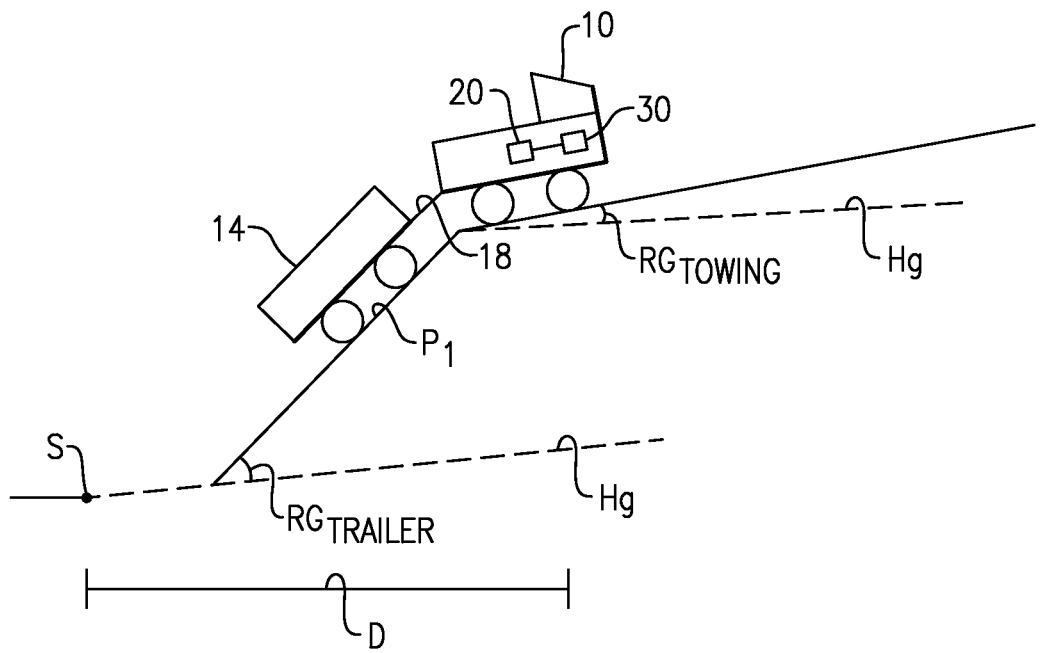
FIG. 1 illustrates an example towing vehicle towing a trailered vehicle.

Referring to the example of FIG. 1, a towing vehicle 10 tows a trailered vehicle 14. The towing vehicle 10 is a truck in this example, and the trailered vehicle 14 is a trailered boat. Both are example vehicles. A mechanical arm 18 couples the towing vehicle 10 to the trailered vehicle 14.

For a given vehicle towed, its associated road grade is, generally, a grade (or slope) of an area beneath the vehicle. Road grade can be expresses as a percentage of variation from a horizontal (zero) grade $H_g$.

A towing vehicle road grade $RG_{TOWING}$ is a grade of an area of the road beneath the towing vehicle 10. A trailered vehicle road grade $RG_{TRAILER}$ is a grade of a road beneath the trailered vehicle 14. In this example, the trailered vehicle road grade $RG_{TRAILER}$ is greater than a grade of the towing vehicle road grade $RG_{TOWING}$.

Although described as road grade, a person having skill in this art and the benefit of this disclosure would understand that a traditional road is not required for there to be a road grade. Road grade refers generally to the area underneath a vehicle whether that area is a road or that area is an off-road.

The towing vehicle 10 includes a sensor assembly 20 that monitors the towing vehicle road grade $RG_{TOWING}$. The assembly may include accelerometers, wheel speed sensors, etc. A person having skill in this art and the benefit of this disclosure would understand how to monitor, or estimate, the towing vehicle road grade $RG_{TOWING}$ using the sensor assembly 20.

The towing vehicle 10 further includes a controller assembly 30 coupled to the sensor assembly 20. The controller assembly 30 is a specialized controller programed to estimate the trailered vehicle road grade $RG_{TRAILER}$ based on the towing vehicle road grade $RG_{TOWING}$. The controller assembly 30 and sensor assembly 20 together provide a trailered vehicle road grade assembly or a system for controlling the trailered vehicle 14.

Notably, the example trailered vehicle 14 includes no sensor assembly or controller assembly to monitor the trailered vehicle road grade $RG_{TRAILER}$. In other examples, the trailered vehicle 14 may include the sensor assembly 20, the controller assembly 30, or both.

In this example, the towing vehicle 10 has towed the trailered vehicle for a drive distance D from a start location S to the location shown in FIG. 1. The towing vehicle 10, and thus the sensor assembly 20, has passed over a position $P_1$.

As the towing vehicle 10 has passed over the position $P_1$, the towing vehicle road grade $RG_{TOWING}$ at the position $P_1$ was previously calculated and measured. The controller assembly 30 includes a memory buffer that records or stores the measurement of the towing vehicle road grade $RG_{TOWING}$.

After the trailered vehicle 14 is positioned over the position $P_1$. The controller assembly 30 applies the stored measurement of the towing vehicle road grade $RG_{TOWING}$ (when the towing vehicle 10 was at the position $P_1$) as the trailered vehicle road grade $RG_{TRAILER}$. The towing vehicle 10 is thus used as a road grade sensor for the trailered vehicle 14.

Figure 2:
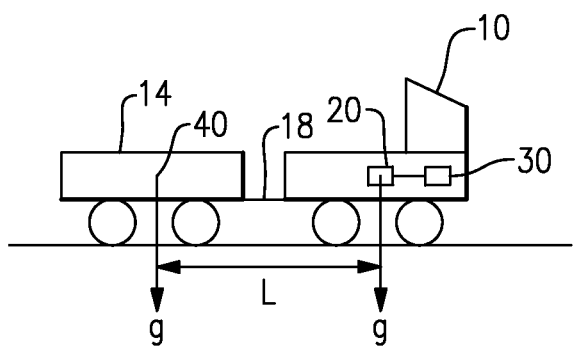
FIG. 2 illustrates a length between the towing vehicle of FIG. 1 and the towing vehicle and trailered vehicle of FIG. 1.

Referring now to FIG. 2 with continuing reference to FIG. 1, the controller assembly 30 can use a length L between the sensor assembly 20 of the towing vehicle 10 and the midpoint 40 of the trailered vehicle 14 when calculating the trailered vehicle road grade $RG_{TRAILER}$. In some examples, as the towing vehicle 10 tows the trailered vehicle 14 for the drive distance D, the controller assembly 30 records the towing vehicle road grade $RG_{TOWING}$ for various positions along the drive distance D. Each of the position across the drive distance D has a corresponding towing vehicle road grade $RG_{TOWING}$.

To calculate the trailered vehicle road grade $RG_{TRAILER}$, the controller assembly 30 effectively shifts towing vehicle road grades $RG_{TOWING}$ the length L, which corresponds to the distance between the sensor assembly 20 and the mid-point 40 of the trailered vehicle 14. The shift is within a spatial domain having the length L.

The road grade for the trailered vehicle 14 is estimated based using length L from the sensor assembly 20 to the midpoint 40. The sensor assembly 20 is at the center of gravity g of the towing vehicle 10, and the midpoint 40 is at the center of gravity g of the trailered vehicle 14.

Other areas of the towing vehicle 10, the trailered vehicle 14, or both could be used. Such adjustments are possible by changing the length L.

After calculating the trailered vehicle road grade $RG_{TRAILER}$, the controller assembly 30 can provide the trailered vehicle road grade $RG_{TRAILER}$ to control operations for the towing vehicle 10. The towing vehicle 10 may make vehicle control adjustments in response to the trailered vehicle road grade $RG_{TRAILER}$. In one example, the vehicle control adjustments include applying more braking force to the towing vehicle 10 to prevent the trailered vehicle 14 from destabilizing or pulling the towing vehicle 14. In another example, the vehicle control adjustments include adjusting a cruise control setting of the towing vehicle 10, or a transmission shift schedule of the towing vehicle 10. The example controller assembly 30 of the system for controlling the trailered vehicle 14 thus adjusts operation of the towing vehicle based on the trailered vehicle road grade $RG_{TRAILER}$.

For example, information about the trailer road grade $RG_{TRAILER}$ can be used by a cruise controller of the towing vehicle 10 to adjust the powertrain torque delivery in a feed-forward manner. Information about the trailer road grade $RG_{TRAILER}$ can be used by a transmission controller of the towing vehicle 10 to adjust its gear scheduling strategy such that gear shifting will be smoother and optimized when the trailered vehicle 14 is adding additional load to the towing vehicle 10.

As can be appreciated, the load on the towing vehicle 10 resulting from road grade can vary greatly when the trailered vehicle 14 is attached to, or detached from, the towing vehicle 10.

Figure 3:
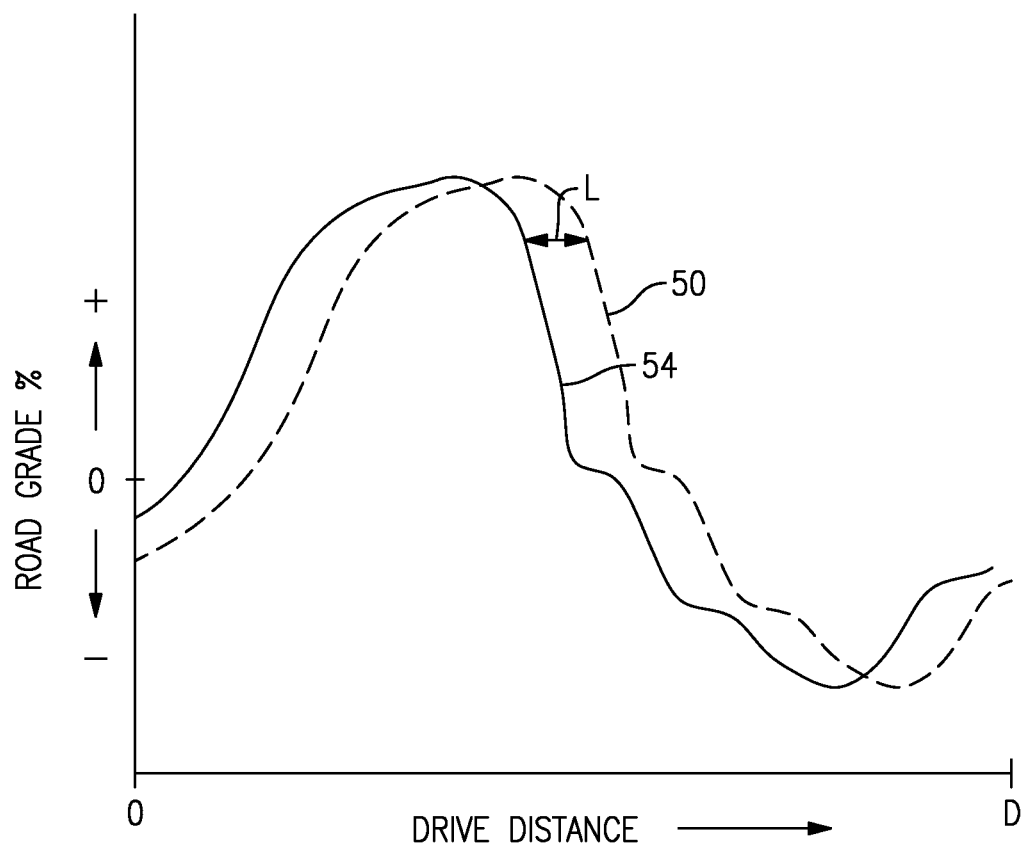
FIG. 3 illustrates a map of a towing vehicle road grade and trailered vehicle road grade verses distance traveled.

FIG. 3 shows a map or visual representation of the shift between the towing vehicle road grades $RG_{TOWING}$, which are represented as line 50, and the trailered vehicle road grades $RG_{TRAILER}$, which are represented as line 54.

In one example method of estimating the towing vehicle road grades $RG_{TOWING}$, an evaluation range is defined by $l_e$, which is a distance parameter covering the largest allowable distance of the trailered vehicle 14 behind the towing vehicle 10.

Next, in the method, an evaluation step distance $l_e$ is defined. The evaluation step distance $l_e$ represents the driving distance elapsed between consecutive recordings of the towing vehicle road grade $RG_{TOWING}$ by the sensor assembly 20 as the towing vehicle 10 moves together with the trailered vehicle 14. The evaluation distance $l_e$ can be one meter, for example. In such an example, the towing vehicle road grade $RG_{TOWING}$ is recorded every meter as the towing vehicle 10 moves together with the trailered vehicle 14.

The method populates a vector of road gradient estimation record with the towing vehicle road grade $RG_{TOWING}$ recordings. This vector is defined by $V_{rg}$ and has dimensions determined by $L_e/l_e$. A buffer length $V_b$ is provided by a rounded integer number, such as $V_b = \text{round}(L_e/l_e)$.

The buffer provide memory for a sequence of values. The buffer length $V_b$ is determined by the number of values needed. The more values needed, the longer buffer length $V_b$.

The method saves the measurements of the towing vehicle road grade $RG_{TOWING}$ as $V_{rg}$ [k]. The trailered vehicle road grade $RG_{TRAILER}$ are then $k*l_e$ behind the evaluation point of the towing vehicle 10.

$V_{rg}$ [k] can be initialized with zeros, or with records from a previous driving cycle. After initializing $V_{rg}$ [k], new towing vehicle road grades $RG_{TRAILER}$ are collected, and the vector of recorded road grades $V_{rg}$ [k] will shift backwards to pass a k-th record to a k+1 record position. The estimations have a length of $L_e$ after the record of $V_{rg}$ [1]. The record at $k=V_b$ is then dropped and replaced by the record at $k=V_b-1$.

The method essentially provides a signal buffer. The method may be executed on software within the controller assembly 30 of the towing vehicle 10.

The proposed method is often most effective when the towing vehicle 10 is pulling or leading the trailered vehicle 14. When reversing, there may not be a towing vehicle road grade measurement available. In that case, the records of road grade are shifted forward by removing signal recorded at k=0. Meanwhile, each buffer cell at k will be replaced by the value from its subsequent record at k+1. The record at $k=V_b$ will then be fed by zero since no new information will be available from the trailer side.

Figure 4:
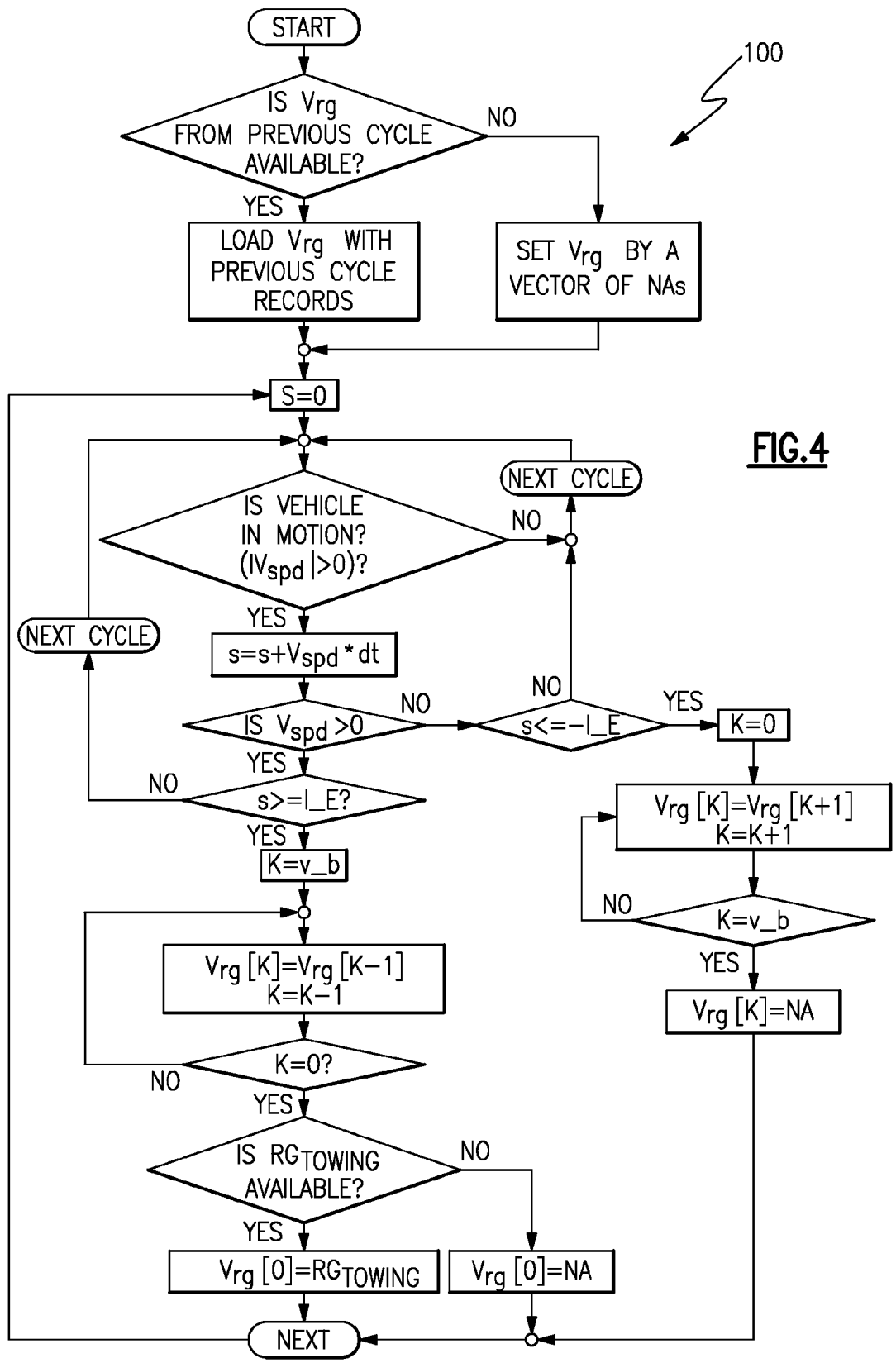
FIG. 4 shows a flowchart of an example method for determining the road grade of the trailered vehicle of FIG. 1.

Referring now to FIG. 4, an example of the above method is summarized in a flowchart 100. Generally, the flowchart 100 shows that by integrating the speed signal, an algorithm knows how far the towing vehicle 10 towing the trailered vehicle 14 have moved since a previous update. Then, when a distance traveled forward by the vehicles is longer than a step distance, an update process will start if new data is available from the towing vehicle 10.

More specifically, in the flowchart 100, $V_{spd}$ stands for vehicle speed, which is typically expressed in unit of meters per second. In the flowchart 100, dt stands for control implementation cycle time, and NA represents not available, such as when an implausible value is provided. Rather than NA, the method may, in another example, use a quality factor associated with $V_{rg}$ [1] to calculate whether the road information at a distance after the towing vehicle 10 can be used for control or not. Further, in FIG. 4, l_E is the step distance, for example, it can be 3 meters. v_b is the number of memory unit needed to save the road grade information at l_E step size up to L_E total length.

Figure 5:
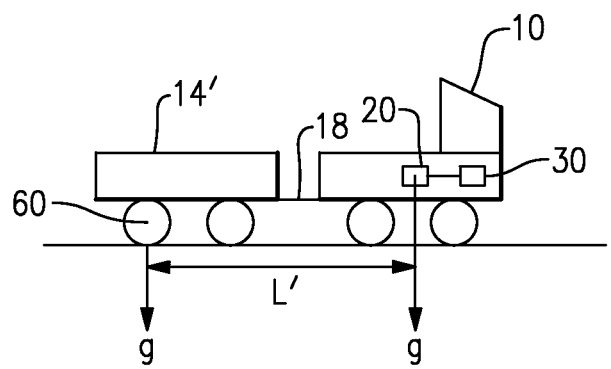
FIG. 5 illustrates another length between the towing vehicle of FIG. 1 and another example trailered vehicle.

After $V_{rg}$ is available, the trailered vehicle road grade $RG_{TRAILER}$ can be evaluated. Due to variety of sizes and types of trailered vehicles 14, the distance of the road slope evaluation point of the trailer behind the evaluation point of the truck is not fixed. In the example of FIG. 5, for example, a trailered vehicle 14' has a single axle 60, and the length L' is a length from the sensor assembly 20 to the axle 60.

The length L or L' typically varies from 10 to 20 meters for commonly used utility trailers and RVs. The evaluation of the trailered vehicle road grade $RG_{TRAILER}$ is done across a range rather than at a point to accommodate this variation.

In some examples, two distance parameters, $L^{MIN}$ and $L^{MAX}$ are specified for the control algorithm and $0 \leq L^{MIN} \leq L^{MAX} \leq L\_E$ executed to calculate the trailered vehicle road grade $RG_{TRAILER}$. For example, $L^{MIN}=10$ meters $L^{MAX}=15$ meters could be used. An evaluation vector Vect_$RG_{TRAILER}$ is constructed out of $V_{rg}$ by $V_{rg}$ [k], $L^{MIN} \leq k*L\_E \leq L^{MAX}$. The final road grade under the trailer for control applications is evaluated with the vector Vect_$RG_{TRAILER}$.

In some examples, the method may use the largest absolute value from Vect_$RG_{TRAILER}$.

In some examples, the method can use a mean value of Vect_$RG_{TRAILER}$ to provide an estimate of the average level of the road grade under the trailer.

In some examples, the method may use a standard deviation value of $V_{rg}$. When the standard deviation is above a threshold, a maximal magnitude of is used. Otherwise, the mean value of is used for the subsequent control algorithm processing.

A quality of the final evaluation of the trailered vehicle road grade $RG_{TRAILER}$ depends, in part, on the number of NAs in the vector $V_{rg}$ [k]. A ratio between the numbers of the valid estimation to NAs can be used to indicate the quality of evaluation.

Methods having flows different than the method of the flowchart 100 may be utilized to calculate the trailered vehicle road grade $RG_{TRAILER}$ in view of the towing vehicle road grade $RG_{TOWING}$.

Features of the disclosed examples include a method and estimator capable of evaluating road grade under a trailered vehicle without the use of complex sensors on the trailered vehicle or an electric coupling between the trailered vehicle and the towing vehicle.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A vehicle control method, comprising:
    recording a towing vehicle road grade for a fixed road position when a towing vehicle tows a trailered vehicle;
    shifting, using a controller, the recording to provide a trailered vehicle road grade for the fixed road position based upon the towing vehicle road grade; and
    initiating a vehicle control adjustment to control the towing vehicle based upon the trailered vehicle road grade.

2. The method of claim 1, wherein the shifting comprises a spatial domain shift of the towing vehicle road grade.

3. The method of claim 1, wherein the vehicle control adjustment comprises increasing braking force applied to the towing vehicle in response to the trailered vehicle road grade.

4. The method of claim 1, wherein the trailered vehicle road grade is an estimated trailered vehicle road grade.

5. A system for controlling a towing vehicle, comprising:
    a sensor to monitor a towing vehicle road grade for a fixed road position; and
    a controller configured to record the towing vehicle road grade, to shift the towing vehicle road grade to provide a trailered vehicle road grade for the fixed road position based upon the towing vehicle road grade, and to initiate a vehicle control adjustment to control a towing vehicle based upon the trailered vehicle road grade.

6. The system of claim 5, wherein the towing vehicle is configured to tow the trailered vehicle.

7. The system of claim 5, wherein the sensor assembly is mounted to the towing vehicle.

8. The system of claim 5, wherein the controller is mounted to the towing vehicle.

9. A system for controlling a towing vehicle, comprising:
    a road grade assembly providing a towing vehicle road grade for a fixed road position, and further providing a trailered road grade for the fixed road position by shifting the towing vehicle road grade for the fixed road position; and a controller configured to initiate a vehicle control adjustment to control the towing vehicle based upon the trailered vehicle road grade.

10. The system of claim 9, wherein the controller adjusts vehicle braking based upon the trailered vehicle road grade.

11. The system of claim 9, wherein the controller adjusts vehicle cruise control based upon the trailered vehicle road grade.

12. The system of claim 9, wherein the controller adjusts a transmission shift schedule based upon the trailered vehicle road grade.

13. A system, comprising:
a controller configured to record a towing vehicle road grade for a fixed road position when a towing vehicle tows a trailered vehicle,
to shift the towing vehicle road grade recorded by the controller to provide a trailered vehicle road grade based upon the towing vehicle road grade, and
to initiate a vehicle control adjustment to control the towing vehicle based upon the trailered vehicle road grade.

14. The system of claim 13, wherein the controller adjusts vehicle braking based upon the trailered vehicle road grade.

15. The system of claim 13, wherein the controller adjusts vehicle cruise control based upon the trailered vehicle road grade.

16. The system of claim 13, wherein the controller adjusts a transmission shift schedule based upon the trailered vehicle road grade.

17. The system of claim 13, including a road grade sensor assembly to sense the towing vehicle road grade.

* * * * *